(12) United States Patent
Hasslinger et al.

(10) Patent No.: US 9,545,116 B2
(45) Date of Patent: Jan. 17, 2017

(54) ISOMALTULOSE COATED COMESTIBLES AND PROCESSES FOR THEIR PREPARATION

(75) Inventors: Bernd Hasslinger, Carlsberg (DE); Jörg Kowalczyk, Eisenberg/Steinborn (DE); Ingrid Willibald-Ettle, Landau (DE); Siegfried Peters, Biblis (DE)

(73) Assignee: SÜDZUCKER AKTIENGESELLSCHAFT MANNHEIM/OCHSENFURT (DE)

( * ) Notice: Subject to any disclaimer, the term of this patent is extended or adjusted under 35 U.S.C. 154(b) by 0 days.

(21) Appl. No.: 12/919,048

(22) PCT Filed: Feb. 7, 2009

(86) PCT No.: PCT/EP2009/000869
§ 371 (c)(1),
(2), (4) Date: Sep. 23, 2010

(87) PCT Pub. No.: WO2009/106218
PCT Pub. Date: Sep. 3, 2009

(65) Prior Publication Data
US 2011/0003029 A1    Jan. 6, 2011

Related U.S. Application Data

(63) Continuation of application No. 12/036,400, filed on Feb. 25, 2008, and a continuation of application No. 12/098,048, filed on Apr. 4, 2008.

(51) Int. Cl.
| | |
|---|---|
| A23G 4/10 | (2006.01) |
| A23G 4/20 | (2006.01) |
| A23G 3/34 | (2006.01) |
| A23G 3/54 | (2006.01) |
| A23G 4/06 | (2006.01) |

(52) U.S. Cl.
CPC .............. *A23G 4/20* (2013.01); *A23G 3/0095* (2013.01); *A23G 3/343* (2013.01); *A23G 3/54* (2013.01); *A23G 4/062* (2013.01); *A23L 27/33* (2016.08); *A23L 29/30* (2016.08); *A23P 20/10* (2016.08); *A23G 2200/06* (2013.01); *A23V 2002/00* (2013.01)

(58) Field of Classification Search
CPC ..... A23L 1/0047; A23G 3/0095; A23G 3/343; A23G 3/54; A23G 4/062; A23G 4/20
USPC ................................. 426/3, 5, 291, 302, 303
See application file for complete search history.

(56) References Cited

U.S. PATENT DOCUMENTS

| | | | | |
|---|---|---|---|---|
| 4,250,195 | A * | 2/1981 | Cherukuri et al. | 426/5 |
| 4,681,766 | A * | 7/1987 | Huzinec et al. | 426/5 |
| 5,292,536 | A | 3/1994 | Sato et al. | 426/5 |
| 5,298,263 | A * | 3/1994 | Yatka et al. | 426/5 |
| 5,399,365 | A * | 3/1995 | Yatka et al. | 426/3 |
| 5,536,511 | A | 7/1996 | Yatka | |
| 6,572,900 | B1 * | 6/2003 | Zyck et al. | 426/5 |
| 2001/0006690 | A1 | 7/2001 | Richey et al. | |
| 2002/0113632 | A1 | 8/2002 | Yatka et al. | |
| 2005/0008747 | A1 | 1/2005 | Barkalow et al. | |

FOREIGN PATENT DOCUMENTS

| | | |
|---|---|---|
| EP | 415656 A2 * | 3/1991 |
| JP | 59-219220 | 12/1984 |
| JP | 04-316455 | 11/1992 |
| WO | WO 92/22217 | 12/1992 |
| WO | WO 00/38532 A | 7/2000 |
| WO | WO 02/21937 A | 3/2002 |
| WO | WO 2006/094685 A | 9/2006 |

OTHER PUBLICATIONS

International Search Report dated Jun. 5, 2009, issued in corresponding international application No. PCT/EP2009/000869.
English language translation of Japanese Notice of Reasons for Rejection dated May 17, 2013 in corresponding Japanese Patent Application No. 2010-547077. (6 pages).

* cited by examiner

*Primary Examiner* — Nikki H Dees
(74) *Attorney, Agent, or Firm* — Ostrolenk Faber LLP

(57) ABSTRACT

Coated comestibles comprising palatinose and a binding agent and processes to obtain these comestibles.

13 Claims, No Drawings

ISOMALTULOSE COATED COMESTIBLES AND PROCESSES FOR THEIR PREPARATION

CROSS REFERENCE TO RELATED APPLICATIONS

The present application is a 35 U.S.C. §371 National Phase conversion of PCT/EP2009/000869, filed Feb. 7, 2009, which claims benefit of U.S. Application No. 12/036, 400, filed Feb. 25, 2008 and U.S. Application No. 12/098, 048, filed Apr. 4, 2008, the disclosures of which are incorporated herein by reference. The PCT International Application was published in the English language.

TECHNICAL FIELD

The present invention relates to improved methods to prepare palatinose-containing comestibles, in particular to prepare coated comestibles, and to the products obtained thereby.

BACKGROUND OF THE INVENTION

It is well know in the art to provide various comestibles which are embedded in hard or soft coatings. Coatings of such comestibles are frequently used to provide the comestibles with specific functions and properties, such as specifically desired organoleptical characteristics, technological properties and/or a particular optical appearance. It is furthermore well known to apply to sugarless or sugar-containing comestibles sugarless or sugar-containing coatings. As sugarless coatings, coatings made from polyols, such as isomalt, xylitol, sorbitol or maltitol are preferred, while for sugar-containing coatings, sucrose is preferred. In the coating processes of the art, the cores to be coated are provided, the polyol or sugar is added in a liquid medium, applied to the cores and dried. In some cases, after the application of the liquid medium to the cores, powdered dry charges are applied to facilitate a more speedy drying and a different coating characteristic.

WO 92/22217 discloses chewing gums, which comprise palatinose, which is also termed isomaltulose. Palatinose is akariogen, does not cause gastrointestinal disturbances, has a sweetening power comparable to conventional polyols and is only slowly degraded in the gastrointestinal tract. The document discloses the use of palatinose in chewing gum centers as well as in their coatings. Since palatinose tends to crystallize out, in particular in form of a monohydrate, palatinose coated comestibles tend to show the phenomenon of chipping. Chipping describes the process of a partial destruction or damage of the coating, when exposed to mechanical stress, for instance during packaging or transportation. Furthermore, known palatinose coated products which are colored display an uneven and mottled distribution of the food color in the coating.

SUMMARY OF THE INVENTION

Thus, the technical problem underlying the present invention is to provide palatinose coated comestibles, which overcome the above-identified technical problems, in particular to provide palatinose coated comestibles, which coatings are more resistant to chipping, that means which show a more elastic behavior of the coating, and therefore have a reduced tendency to be damaged or destroyed when exposed to mechanical stress. Furthermore, it is another object of the present invention to provide coated comestibles which have a coating that displays a more even and homogenous distribution of food colors contained therein.

The present invention solves said problem by the provision of the teaching of the independent claims. In particular, the present invention solves said problems by providing a process for coating comestibles comprising the steps of
   a) providing cores of comestibles to be coated and
   b) applying to the cores a first liquid medium comprising palatinose and a binding agent, in particular gum arabic, so as to obtain at least one layer of a first coating, wherein said first coating comprises at least 5 weight-% of the binding agent (based on the total dry weight of the coating).

The present invention overcomes the above-identified technical problems by providing a coating of a core of a comestible, which contains a considerably higher amount of a binding agent in combination with palatinose as used before. In particular, it could surprisingly be shown that the use of at least 5 weight-%, preferably 5 to 10 weight-%, of a binding agent (based on the total dry weight of the coating) together with palatinose advantageously and unexpectedly improves the chipping behavior of the coatings, i.e. reduces the extent and frequency of the chipping. In particular, it could be shown that under mechanical stress, in particular mechanical pressure and/or shearing force, the coatings of the present invention remain intact or at least considerably less damaged than palatinose coated products of which the organoleptical and technological properties are comparable, but which have been prepared with less binding agent, in particular less than 5 weight-%. The use of at least 5% binding agent, in particular gum arabic, in combination with palatinose in the coating provides a more elastic coating, avoiding or reducing chipping of the coating. Furthermore, it could be shown that the high amount of binding agent, in particular gum arabic, in the coating combined with palatinose leads to a more homogenous distribution of food colors contained in said coating.

DETAILED DESCRIPTION OF CERTAIN EMBODIMENTS OF THE INVENTION

In the context of the present invention, a comestible is a food, in particular a confectionery product, preferably for human, but also for animal consumption.

In the context of the present invention, a liquid medium is preferably an aqueous coating medium, in particular a solution or suspension of the coating ingredients to be applied to the cores in water.

In a preferred embodiment of the present invention, subsequent to step b) a second liquid medium comprising palatinose and a binding agent, preferably gum arabic, is applied to the first coating in a process step c) so as to obtain at least one layer of a second coating and wherein in the second coating the amount of the binding agent is higher than in the first coating.

In a preferred embodiment of the present invention the binding agent is a water soluble hydrocolloid. The binding agent is preferably gum arabic, gelatine, gum tragacanth, locust bean gum, guar gum, vegetable gums, alginate, maltodextrines, corn syrup, pectin, cellulose-type materials, carboxymethylcellulose, hydroxymethylcellulose, potato starch, corn starch, starch, modified starch, rice starch, xanthan or mixtures thereof.

In a preferred embodiment of the present invention, the binding agent used according to the present invention and used for the first coating is the same as the binding agent used for the second coating. However, it is in another embodiment also foreseen that the binding agent used in the preparation of the first coating is different to the binding agent used for the preparation of the second coating.

In a preferred embodiment of the present invention the amount of the binding agent in the first coating is 5 to 10 weight-%.

In a preferred embodiment of the present invention the amount of the binding agent in the second coating is 11 to 20%.

In a preferred embodiment of the present invention the first liquid medium is free of food colors.

In a preferred embodiment of the present invention the second liquid medium comprises at least one food color.

In a preferred embodiment of the present invention a food color may be a food quality dye, i.e. carotene or $TiO_2$.

Preferred embodiments for a food color to be used according to the present invention are coloring foodstuffs, preferably black carrot, elderberry, aronia, grape, beetroot, paprika, carrot, turmeric root, spinach, stinging nettle or burnt sugar.

In a further preferred embodiment of the present invention, the food color used is a natural color, preferably carmine, annatto, beta-carotene, lutein, riboflavin, curcumin, copper-chlorophyll, chlorophyll, caramel, vegetable carbon or titanium dioxide.

In another preferred embodiment of the present invention, the food color used is a synthetic color, preferably allura red, carmoisine, amaranth, tartrazine, quinoline yellow, patent blue V, brilliant blue or indigo carmine.

In a preferred embodiment of the present invention the first liquid medium is free of food color, while the second liquid medium contains at least one food color.

In a preferred embodiment of the present invention the process further comprises the steps of
d) evaporating water from the at least one layer of the first coating obtained in step b), preferably by drying, and
e) repeating steps b) and d) to build up more than one layer, for instance 2 to 100, in particular 2 to 50, preferably 20 to 40 layers, of the first coating.

In a preferred embodiment of the present invention the process further comprises the steps of
f) evaporating water from the at least one layer of the second coating obtained in step c), preferably by drying, and
g) repeating steps c) and f) to build up more than one layer, for instance 2 to 100, in particular 2 to 50, preferably 10 to 40 layers, most preferably 10 to 20 layers of the second coating.

In a particularly preferred embodiment of the present invention it is foreseen to provide a process for coating comestibles, which are particularly resistant to chipping by conducting the above-identified coating and evaporation processes in a particularly high number of cycles, that means coating and drying steps, in particular 100 to 200 cycles. In a particularly preferred embodiment, it is therefore foreseen to repeat steps b) and d) 100 to 200 times. In a furthermore preferred embodiment it is foreseen to repeat steps c) and f) 100 to 200 times. In a furthermore preferred embodiment, it is foreseen in a combined embodiment to repeat steps b) and d) 100 to 200 times and c) and f) 100 to 200 times. The use of a high number of cycles allows short drying times, so as to obtain coated products, which do not show a significant crunch and therefore have a reduced hardness so as to avoid chipping. The residual water content of the coated products in a preferred embodiment is slightly higher than when using fewer cycles for the same quantity of coating material. This particular embodiment has the further advantage of showing a reduced stickiness of the coated products on the inner surface of the coating drum and, furthermore, the coated products show a more homogenous distribution of the coating ingredients and smooth is surface of its coating and additionally an improved processability for further steps, such as a film-coating application step.

In a preferred embodiment of the present invention, during or after step b) powdered palatinose is applied in a dusting step over the at least one layer of the first coating.

In a preferred embodiment of the present invention during or after step c) powdered palatinose is applied in a dusting step over the at least one layer of the second coating.

In a preferred embodiment of the present invention the process comprises adding powdered palatinose to the at least one layer of the first, or of the second coating or of the first and second coating and repeating steps b), or c) or b) and c) and the subsequent dusting step, i.e. the addition of the powdered palatinose, so as to build up more than one layer of the first and/or second coating.

Thus, the present invention foresees in a preferred embodiment at least one dusting step, according to which after step b), that means after applying a first liquid medium to the core, powdered palatinose is added as a dry charge and the steps of applying a first liquid medium and the powdered palatinose is repeated several times, so as to build up more than one layer of the first coating. In a furthermore preferred embodiment of the present invention, it is foreseen that subsequent to step c) that means after applying the second liquid medium to the core, powdered palatinose is added as a dry charge and the steps of applying a second liquid medium and the powdered palatinose is repeated several times so as to build up more than one layer of the second coating. In a preferred embodiment of the present invention, dry charges are added both after step b) and after step c), preferably repeatedly.

In a preferred embodiment of the present invention the cores of the comestibles are filled chewing gum centers, non-filled chewing gum centers, tablets, soft caramels, hard caramels, chewing candies, boiled candies, chocolate, jelly gums, nuts or marshmallows.

The present invention also relates to coated comestibles comprising a core and a first coating, wherein the first coating comprises palatinose and at least 5 weight-%, preferably 5 to 10 weight-% (based on total dry weight of the first coating) of a binding agent.

In a preferred embodiment of the present invention the coated comestible comprises a first coating comprising palatinose and at least 5 weight-% of a binding agent, preferably 5 to 10 weight-% (based on total dry weight of the first coating) of the binding agent, and a second coating comprising palatinose and a binding agent, preferably 11 to 20 weight-% (based on total dry weight of the second coating) of the binding agent, wherein the amount of the binding agent in the second coating is higher than in the first coating.

In a preferred embodiment of the present invention the first coating is free of food colors, while the second coating comprises at least one food color.

In a preferred embodiment of the present invention, the first coating comprises 10 to 95, preferably 30 to 95, most preferably 40, 50, 60, 70, 80 or 90 to 95% palatinose (based on total dry weight of the first coating).

In a furthermore preferred embodiment of the present invention, the second coating of the present invention comprises 10 to 95, preferably 30 to 89, most preferably 40, 50, 60, 70, 80 or 85 to 89% palatinose (based on total dry weight of the second coating).

In the context of the present invention the combination of weight-percentage values for at least two coating ingredients contained together in a first or second coating add up to 100 weight-% (based on total dry weight of coating).

In a particularly preferred embodiment of the present invention, the coated comestible comprises a core and solely a first coating. In a furthermore, even more preferred embodiment, the coated comestibles of the present invention comprise a core, a first coating and a second coating.

In a preferred embodiment, it is foreseen that the total coating comprising the first and the second coating comprises 40 to 90, preferably 50 to 90, most preferably 60 to 90 weight-% first coating and 10 to 60, preferably 10 to 50 and most preferably 10 to 40 weight-% of the second coating (each based on dry weight of total coating).

In a further preferred embodiment of the present invention, the coating, in particular the first coating, the second coating or the first and second coating comprises in addition to palatinose and the binding agent at least one further panning additive.

In the context of the present invention, a panning additive is any substance which may be added into the coating process to either influence the coating or panning process itself and/or influence product characteristics, which may either be relevant for the process or for the finally obtained product, for instance its organoleptic, sensoric, physiological, storage or optical behavior.

In a preferred embodiment of the present invention, the first, the second or the first and second coating each comprises 1 to 60 weight-%, preferably 1 to 45 weight-% (based on total dry weight of the first or second coating) of the at least one panning additive.

In a preferred embodiment of the present invention, the first, the second or the first and second coating each comprises 1 to 30 weight-%, preferably 1 to 20 weight-% of the at least one panning additive (based on total dry weight of the first or second coating).

In a preferred embodiment of the present invention, the first coating comprises 30 to 90 weight-% palatinose (based on total dry weight of the first coating).

In a preferred embodiment of the present invention, the first coating comprises 5 to 8 weight-% binding agent (based on total dry weight of the first product coating).

In a preferred embodiment of the present invention, the comestible comprises a core and a first coating, wherein the first coating comprises 5 to 10 weight-% binding agent, 25 to 95 weight-% palatinose and 0 to 70 weight-%, preferably 1 to 70 weight-% (each based on dry weight of the first coating and all constituents adding up to 100% total weight of first coating) of at least one panning additive.

In a preferred embodiment of the present invention, the comestible comprises a core, a first coating and a second coating, wherein the first coating comprises 5 to 10 weight-% binding agent, 25 to 95 weight-% palatinose and 0 to 70 weight-% (each based on dry weight of the first coating and all constituents adding up to 100% total weight of first coating) of at least one panning additive and the second coating comprises 11 to 20 weight-% binding agent, 25 to 89 weight-% of palatinose and 0 to 70 weight-%, preferably 1 to 70 weight-% (each based on total dry weight of second coating and all constituents adding up to 100% total weight of second coating) of at least one panning additive.

In a preferred embodiment of the present invention, the second coating comprises 30 to 90 weight-% palatinose (based on total dry weight of the second coating).

In a preferred embodiment of the present invention, the second coating comprises 13 to 17 weight-% binding agent (based on total dry weight of the second product coating).

In a preferred embodiment of the present invention, the at least one panning additive is selected from groups consisting of calcium carbonate, polyol, leucrose, sugar alcohol, rice starch, $SiO_2$, magnesium carbonate, high intensity sweetener, flavoring, aroma, colorant, preserving agent, mineral salt, emulsifier, vitamin, active pharmaceutical ingredients and talc.

It is also possible according to the present invention in one embodiment that the panning additive is a conventional sugar, such as sucrose, fructose or glucose.

Most preferably, however, the present invention relates to a comestible or a coating thereof which is free of sucrose or free of fructose or free of glucose or free of both or all of them.

It is preferred according to the present invention, that the first coating, the second coating and preferably both coatings comprise palatinose as the only sugar.

It is furthermore preferred according to the present invention, that the first coating, the second coating or the first and second coating comprise palatinose as the only sweetening agent providing a sweetening power and body to the coating. Thus, in a preferred embodiment of this embodiment of the present invention, the first coating, the second coating or the first and second coating comprise palatinose and at least one intensive sweetener as the only sweetening agents.

It is also preferred according to the present invention that the palatinose contained in the first coating, in the second coating, or in the first and second coating is the only sweetening agent present at all in the first coating, the second coating or the first and second coating.

In another preferred embodiment of the present invention, the first coating, the second coating or the first and second coating comprise palatinose and a non-sugar further sweetening agent, such as a sugar-alcohol and/or a high intensity sweetener as the only sweetening agents contained in the coating.

In a preferred embodiment of the present invention, the first, second or first and second coating comprises at least one high intensity sweetener as a panning additive.

In a preferred embodiment of the present invention, the first and/or second coating comprises a high intensity sweetener selected from the group consisting of thaumatin, stevioside, rebaudioside A, neohesperidin dihydrochalcone, acesulfam K, aspartame, cyclamate, saccharin, glycyrrhicine, alitame, monellin and sucralose.

In a preferred embodiment of the present invention, the at least one sugar alcohol is a mono- or disaccharide alcohol.

In a preferred embodiment of the present invention, the at least one sugar alcohol is selected from the group consisting of maltitol, xylitol, isomalt, which is a mixture of 1.6-GPS and 1.1-GPM of 43 to 57% 1.6-GPS and 57 to 43% 1.1-GPM, preferably a 1:1 mixture, sorbitol, erythritol, mannitol, lactitol, 1-O-α-D-Glucopyranosyl-D-sorbitol (1,1-GPS), 1-O-α-D-Glucopyranosyl-D-mannitol (1.1-GPM), 6-O-α-D-Glucopyranosyl-D-sorbitol (1.6-GPS), isomalt GS, which is a mixture of 72 to 78%, preferably 75%, 1.6-GPS and 22 to 28%, preferably 25% (all % given in weight of dry matter), 1.1-GPM, and a mixture of 1.1-GPM, 1.1-GPS and 1,6-GPS.

In a particularly preferred embodiment the sugar-alcohol is isomalt. In a further particularly preferred embodiment, the sugar-alcohol is isomalt GS.

In a preferred embodiment of the present invention, the first, the second or the first and second coating comprises 50 to 80 weight-% of the at least one sugar alcohol (based on dry weight of the product coating).

According to the invention, it is provided that the core, in particular the chewing gum core, can be produced by customary methods. After producing the product cores, in particular the chewing gum cores, the finished cores are, for the preparation of the first and/or second coating, preferably dragee-coated, with dragee-coating methods which are customarily used. In preferred embodiments, cores can be subjected according to the present invention to a soft dragee coating or a hard dragee coating. A "soft dragee coating" means the application of the coating ingredients, in particular the binding agent and the palatinose, optionally also the panning additive, dissolved or suspended in water to moving cores, in particular chewing gum cores, with, after each application, a powder of all or one of the coating ingredients being dispersed on to dry the coating layer, i.e. to bind the moisture, which regularly leads to a residual water content of 7 to 10% (without consideration of crystal water content) and a soft coating. This type of dragee coating produces a soft dragee coating. A "hard dragee coating" means, as in the soft dragee coating, the application of the coating ingredients dissolved or suspended in water onto moving cores, optionally with coating ingredients powder being applied, but rather the non-aqueous constituents being dried on using hot, warm or cold air, which leads to a residual water content of 1-5% (without consideration of crystal water content) and a hard coating. As in the soft dragee coating, preferably a multiplicity of different individual applications, called repetitions or cycles, are carried out, between which drying is performed with warm air or cold air, so that dragee coatings of different thicknesses can be produced. The hard dragee coating method can also be carried out using two or more different coating solutions which are applied successively.

In a preferred embodiment of the inventive method, the core, in particular chewing gum core, is coated with the first and/or second coating by means of at least one hard-dragee-coating step, with the layer comprising the palatinose and the binding agent. The hard-dragee coating step comprises applying a solution or suspension which comprises at least one binding agent, palatinose and optionally at least one panning additive, and subsequently drying the applied solution or suspension with an air stream.

In a further preferred embodiment of the inventive method the core, in particular chewing gum core, is coated with the first and/or second coating by means of at least one soft dragee-coating step, with the layer comprising the palatinose and the binding agent. The soft-dragee coating step comprises applying a solution or suspension which comprises at least one binding agent and the palatinose, optionally also at least one panning additive, and dusting the applied solution or suspension with a powder of palatinose and/or the binding agent. In a preferred embodiment, the applied solution or suspension comprises the total amount of the binding agent or a part thereof. In a preferred embodiment the binding agent is completely or partially introduced into the solution or suspension and is applied to the cores to be dragee-coated. In a further preferred embodiment, the powder comprises the total amount of the binding agent or a part thereof. In a preferred embodiment, the binding agent is completely or partially used as powder for dusting the solution or suspension applied to the core.

The present invention also relates to a method for the preparation of a comestible with a first, preferably also with a second coating, preferably of a coated product according to the above, wherein the comestible comprises a core and a first coating and the first coating comprises at least the coating ingredients at least one binding agent, palatinose and optionally at least one panning additive, which process comprises applying a coating medium comprising at least partially the coating ingredients to said core, and drying the coated product, so as to obtain a first coating, which comprises 5 to 10 weight-% binding agent, 25 to 95 weight-% of palatinose and 0 to 70 weight-% (each based on total dry weight of first coating) of at least one panning additive. Preferably, the method also comprises the application of a second liquid medium comprising at least partially the coating ingredients to said core which comprises the first coating and drying the coated products so as to obtain a second coating, which comprises 11 to 20 weight-% binding agent, 25 to 89 weight-% of palatinose and 0 to 70 weight-% (each based on total dry weight of first coating) of at least one panning additive.

In a preferred embodiment of the present method, the drying is done by subjecting the coated product to air, in particular an air stream, preferably a constant air stream, having a temperature of 20° C. to 80° C., preferably 30° C. to 80° C., in particular 25° C. to 45° C.

In a preferred embodiment of the present method, the drying is done by adding part of the coating ingredients in dry and powdered form to the coated products during or after step b) for the first coating and/or, for the second coating, step c).

Preferably, the solid content of the first and optionally second liquid medium is from 30 to 90%, preferably 50 to 75% (weight-% based on total weight of liquid medium).

In a preferred embodiment, the first and optionally second liquid medium has a temperature from 50 to 85° C., preferably 65° C. to 75° C.

In a preferred embodiment of the present method, during application of the first and/or second liquid medium the coated products are subjected to a distribution step, wherein the coated products are agitated to allow a homogenous distribution of the coating medium on the product core.

In a preferred embodiment of the present method all coating ingredients are applied in form of the first and optionally the second liquid medium, in particular as a coating suspension or a coating solution.

In a preferred embodiment of the present method, a part of the coating ingredients is applied in form of a liquid coating medium and a further part is applied in dry and powdered form.

In a preferred embodiment of the present method, all or part of the palatinose of the coating is added in dry and powdered form.

In a preferred embodiment of the present method, at least a part of the binding agent is added in dry and powdered form.

In a preferred embodiment of the present method, preferably in a hard coating method, the application of the first, and optionally of the second, liquid medium and the subsequent drying are repeated one or more times (each time also being called a cycle), preferably 80 to 120 times. A preferred hard coating method of the present invention results in a residual water content of the coating from preferably 1 to 5% (by weight, without consideration of crystal water content) In a preferred embodiment of the present invention, preferably in a soft coating method, the application of the first, and optionally of the second, liquid medium and the subsequent drying are repeated 3 to 10 times. A preferred soft coating method of the present invention results in a residual water content of the coating from preferably 7 to 10% (by weight, without consideration of crystal water content).

In a furthermore preferred embodiment of the present invention, the application of the first liquid medium and the subsequent drying, that means steps b) and d), are repeated 100 to 200 times, i.e. in 100 to 200 cycles. In a further preferred embodiment wherein a second coating is applied, the application of the second liquid medium and the subsequent drying is repeated 80 to 120 times, i.e. 80 to 120 cycles. However, it is also preferred to repeat the application of the second liquid medium and the subsequent drying 100 to 200 times, that means to carry out 100 to 200 cycles.

In a furthermore preferred embodiment, in which a particularly high number of cycles is conducted, namely 100 to 200 cycles, the residual water content of the coating in a hard coating method of the present invention is a water content of 1.5 to 5.5%, preferably 3 to 7% (each by weight, without consideration of crystal water content). In a furthermore preferred embodiment of the present invention, in which a particularly high number of cycles, namely 100 to 200 cycles, is conducted, a soft coating method of the present invention provides a soft coating with a residual water content from 7.5 to 10.5%, preferably 9 to 12% (each by weight, without consideration of crystal water content).

In a preferred embodiment of the present method, the coating ingredients applied in dry and powder form represent 30 to 75% by weight, preferably 40 to 75% by weight of the overall amount of the coating ingredients of the first, and optionally of the second, coating (each separately based on total dry weight of the first and, if present, of the second coating).

In a preferred embodiment of the present method comprising at least one repetition of the coating and drying steps, i.e. two cycles, either in preparing the first or the second or both coatings, it is foreseen that in a first phase of the method, the coating medium is applied and the drying is done, the latter by adding part of the coating ingredients in dry and powdered form to the coated products one or more repeated times and wherein in a second phase of the method the first, and optionally the second liquid coating medium is applied to the coated products and dried by subjecting the coated products to drying air one or more repeated times without the addition of dry and powdered coating ingredients. It is also possible to reverse the order of the first and second phase or to alternate the cycles.

In a preferred embodiment of the present method, the drying is done both by subjecting the coated product to air, preferably an air stream, having a temperature of 20 to 80° C. and by adding part of the coating ingredients in dry and powdered form to the coated products.

In a preferred embodiment of the present method, the coating and drying steps are repeated 5 to 50 times.

In a furthermore preferred embodiment, the present invention relates to a method for preparing the above-identified coated comestible comprising a core and a first, and optionally second, coating, which comprises in a first process step applying a first liquid medium, for instance a coating solution or a coating suspension, comprising a first part of the coating ingredients to the core for the purpose of applying one layer and then, in a second process step dusting with a second part of the coating ingredients, i.e. one or more of the coating ingredients in powder form, and drying, preferably with air, in particular an air stream, at 20 to 80° C., the coated cores, wherein the second part of the ingredients, in particular the palatinose, the at least one binding agent and optionally at least one panning additive, are applied in an amount from 30% to 75%, preferably 30% to 60%, preferably 40% to 55%, based on total solid content of the first coating, and wherein preferably said steps are optionally repeated one or more times in alternation, preferably five to 50 times In a preferred embodiment in which a second coating is desired, said series of process steps has to be conducted with a second liquid medium and the corresponding dry charge of coating ingredients.

In a furthermore preferred embodiment of the present invention it is foreseen that after conducting the cycles and thereby applying the first and optionally second coating a final finishing step, in particular a step to apply at least one film forming agent, is conducted so as to obtain by the use of at least one film-forming agent a film coating on the coated cores. Preferably, such a film coating may also comprise at least one food color.

The present invention also relates to coated comestibles prepared according to any one of the above-identified processes.

Further preferred embodiments of the present invention are the subject-matter of the subclaims.

EXAMPLES

The invention will now be described in more detail by way of the non-limiting examples.

Example 1

Comestible with a First Coating

1a) Recipe of Coating with Color:

| | |
|---|---|
| Palatinose | 54% |
| Gum arabic (50% solution) | 10% |
| $TiO_2$ | 0.6% |
| Water | 35.4% |
| Cores: | 6-8 kg chewing gum cores |

Temperature of suspension for coating: 70° C.

The coating process is conducted in a driacouter 500/600 Vario.

drying air: 25-30° C.,

20% relative humidity at 25° C., 5 m³/min

Coating time 3 hr, the coating represents about 30% of total dry weight of comestible If desired, powdered palatinose may be added to the coated cores during the coating process.

The coating of the above prepared coated chewing gum comprises 8.4 weight-% of the binding agent gum arabic (based on total dry weight of the coating) and about 90.6 weight-% palatinose (based on total dry weight of the coating). In contrast to chewing gums coated with a coating comprising less than 5 weight-% gum arabic (based on total dry weight of the coating) and having the same organoleptic and technological properties as the presently obtained coated products, the comestibles according to the present example show reduced chipping and a more elastic coating.

1 b) Recipe of Coating without Color:

Alternatively, a coated comestible may be prepared with the same recipe of 1a), except that $TiO_2$ as a food color is omitted. Using the same process conditions as identified in 1a), a coated comestible without food color and having a first coating is obtained, which has the same organoleptic and technological properties as a conventionally prepared coated product, but which shows reduced chipping and a more elastic coating.

Example 2

Comestibles with a First and Second Coating

Recipe of Coating:
1) First Coating (White):

| Syrup 1: | Palatinose | 60% |
|---|---|---|
| | Gum arabic (50% solution) | 10% |
| | TiO$_2$ | 1% |
| | Water | 29% |
| | Cores: | 9 kg |

Coater: Driacoater 500/600 Vario
Temperature of coating syrup: 70° C.
Drying air: 25-30° C.
20% r.h. (relative humidity) at 25° C., 5 m$^3$/min
63 Layers, about 25% coating
Powder palatinose was added during the first two cycles (per cycle: 50 g palatinose) of the coating process for the first coating.
Coating time: 113 min
Coating Process

| Phase | Number of cycles | Amount of syrup [g] |
|---|---|---|
| 1 | 1 | 70 |
| 2 | 5 | 60 |
| 3 | 5 | 70 |
| 4 | 50 | 80 |
| 5 | 2 | 50 |

2a) Second Coating (Color Carmoisine):
Cores: 6 kg of white coated product

| Syrup 2: | Palatinose | 55% |
|---|---|---|
| | Gum arabic (50% solution) | 20% |
| | Water | 25% |
| Additional: | Color (Eurocert Carmoisine, 311804 SAM, Sensient) | 0.02% |

20 Layers:
Same conditions as first coating
45 minutes (including waxing)
Coating Process (Color Carmoisine)

| Phase | Number of cycles | Amount of syrup [g] |
|---|---|---|
| 1 | 5 | 70 |
| 2 | 15 | 60 |
| 3 | Waxing | |

2b) Second Coating (Color Allura Red):
Alternatively to the second coating 2a) as described in Example 2a), a second coating with another color may be used.
Cores: 6 kg of white coated product

| Syrup 2: | Palatinose | 55% |
|---|---|---|
| | Gum arabic (50% solution) | 20% |
| | Water | 25% |
| Additional: | Color (Allura Red, 952380, Sensient) | 0.12% |

30 Layers:
Same conditions as first coating
60 minutes (including waxing)
Coating Process (Color Allura Red)

| Phase | Number of cycles | Amount of syrup [g] |
|---|---|---|
| 1 | 5 | 70 |
| 2 | 25 | 60 |
| 3 | Waxing | |

The number of layers depends on the desired color intensity. Both products of 2a) and 2b) show homogenous color distribution and excellent crunch.

Example 3

Comestibles with a Film Coated First Coating

Recipe for the First Coating

| 60% | Palatinose | 75° C. |
|---|---|---|
| 7% | Gum arabic Sol. (50 %) | |
| 1% | Titaniumdioxide | |
| 32% | Water | |

Cores: 7.5 kg chewing gum cores
Coating Process

| Phase | Syrup | Distribution (coating) time | Drying time | No. of cycles |
|---|---|---|---|---|
| 1) | 30 g | 0.3 min | 0.7 min | × 15 |
| 2) | 40 g | 0.4 min | 0.8 min | × 15 |
| 3) | 50 g | 1 min | 0.5 min | × 110 |
| 4) | 40 g | 1 min | 0.4 min | × 10 |
| 5) | 40 g | 3 min | / | × 1 |
| | | | | 151 cycles |

Subsequently, a waxing step for obtaining a white final product, or alternatively as another finishing step, a film coating step with the following recipe is conducted:
Recipe

| Sepifilm 050 | 180 g | 25° C. | spraying Rate |
|---|---|---|---|
| Water | 1320 g | | 25 g/min |
| Ethanol | 15 g | | |
| Brillant Blue (Sensient Colour) | 9 g | | |

Process time: 60 min

What is claimed is:
1. A process for coating comestibles comprising the steps of:
   a) providing cores of comestibles to be coated;
   b) applying to the cores a first liquid medium comprising isomaltulose and a binding agent so as to obtain at least one layer of a first coating, wherein said first coating comprises 5 to 8 weight-% of the binding agent (based on the total dry weight of the first coating) which binding agent is a water soluble hydrocolloid, and wherein said first coating comprises 70 to 95 weight-% isomaltulose (based on the total dry weight of the first coating);
c) evaporating water from the at least one layer of the first coating obtained in step b);
d) repeating steps b) and c) to build up 20 to 100 layers of the first coating;
e) applying to the first coating a second liquid medium comprising isomaltulose and a binding agent so as to obtain at least one layer of a second coating, wherein said second coating comprises 13 to 17 weight-% of the binding agent (based on the total dry weight of the second coating), and wherein said second coating comprises 70 to 85 weight-% isomaltulose (based on the total dry weight of the second coating):
f) evaporating water from at least one layer of the second coating obtained in step e); and
g) repeating steps e) and f) to build up 10 to 100 layers of the second coating.

2. The process according to claim 1, wherein the first liquid medium is free of food colours.

3. The process according to claim 1, wherein the second liquid medium comprises at least one food colour.

4. The process according to claim 1, wherein the first liquid medium comprises no food colour, while the second liquid medium contains at least one food colour.

5. The process according to claim 1, wherein during or after step b) powdered isomaltulose is applied over the at least one layer of the first coating.

6. The process according to claim 1, wherein during or after step e) powdered isomaltulose is applied over the at least one layer of the second coating.

7. The process according to any one of claim 5 or 6, which comprises repeating at least one of steps b) and e) and the addition of the powdered isomaltulose so as to build up more than one layer of at least one of the first and second coating.

8. The process according to claim 1, wherein the binding agent is at least one selected from the group consisting of gum arabic, gelatine, gum tragacanth, locust bean gum, guar gum, vegetable gums, alginates, maltodextrines, corn syrup, pectin, starch, modified starch, corn starch, potato starch, rice starch, carboxymethylcellulose, hydroxymethylcellulose, xanthan and mixtures thereof.

9. The process according to claim 1, wherein the cores are selected from the group consisting of filled chewing gum centres, non-filled chewing gum centres, tablets, soft caramels, hard caramels, chewing candies, boiled candies, chocolate, jelly gums, nuts and marshmallows.

10. The process according to claim 1, wherein in step b) at least one panning additive is contained in the first liquid medium.

11. The process according to claim 1, wherein in step e) at least one panning additive is contained in the second liquid medium.

12. The process according to claim 1, wherein after building up the second coating, at least one film-forming agent is applied on the coated comestible so as to obtain a film coated comestible.

13. The process according to claim 12, wherein the film forming agent and at least a food color are applied so as to obtain a colored film coated comestible.

* * * * *